(12) United States Patent
Kuo

(10) Patent No.: US 7,596,727 B2
(45) Date of Patent: Sep. 29, 2009

(54) SYSTEM AND METHOD FOR ANALYZING AN MTBF OF AN ELECTRONIC PRODUCT

(75) Inventor: Szu-Wei Kuo, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 316 days.

(21) Appl. No.: 11/309,564

(22) Filed: Aug. 23, 2006

(65) Prior Publication Data
US 2007/0165381 A1 Jul. 19, 2007

(30) Foreign Application Priority Data
Nov. 17, 2005 (CN) .................... 2005 1 0101491

(51) Int. Cl.
*G06F 11/00* (2006.01)
(52) U.S. Cl. .................. 714/47; 714/46
(58) Field of Classification Search ........... 714/46, 714/47
See application file for complete search history.

(56) References Cited

U.S. PATENT DOCUMENTS

| 6,684,349 | B2 | 1/2004 | Gullo et al. | |
|---|---|---|---|---|
| 7,120,566 | B1 * | 10/2006 | Brand et al. | 703/2 |
| 2002/0078403 | A1 * | 6/2002 | Gullo et al. | 714/37 |
| 2007/0079190 | A1 * | 4/2007 | Hillman et al. | 714/724 |
| 2007/0165381 | A1 * | 7/2007 | Kuo | 361/704 |

* cited by examiner

Primary Examiner—Emerson C Puente
(74) Attorney, Agent, or Firm—Winston Hsu

(57) ABSTRACT

A system for analyzing a mean time between failures (MTBF) of an electronic product is disclosed. The system includes a database (10) comprising a plurality of bill of material (BOM) tables (100) that stores data on components of the electronic product; and a computer (3) installed with a spreadsheet (300) for analyzing the MTBF of the electronic product. The computer includes: a data importing module (301) for importing the data stored in the BOM tables to the spreadsheet; a reliability analyzing module (302) for classifying the data in the spreadsheet, analyzing the reliability of the electronic product by calculating the MTBF of the electronic product in the spreadsheet, and for generating a reliability prediction report; and a report outputting module (303) for outputting the reliability prediction report to an output device (40). A related method is also disclosed.

9 Claims, 4 Drawing Sheets

SYSTEM AND METHOD FOR ANALYZING AN MTBF OF AN ELECTRONIC PRODUCT

FIELD OF THE INVENTION

The present invention generally relates to systems and methods for analyzing reliability of products, and more particularly to a system and method for analyzing a mean time between failures (MTBF) of an electronic product.

DESCRIPTION OF RELATED ART

It is generally understood that a mean time between failures (MTBF) rating is a measure of how reliable a hardware product or component is. For most components, the measure is typically in thousands or even tens of thousands of hours between failures. For example, a hard disk driver may have MTBF ratings of about 500,000 hours. A desired MTBF can be used as a quantifiable objective when designing a new product. The MTBF figure can be developed as the result of intensive testing, based on actual product experience, or predicted by analyzing known factors such as raw data supplied by the manufacturer. The manufacturer may provide the MTBF as an index of a product's or component's reliability and, in some cases, to give customers an idea of how much service to plan for.

The MTBF is a calculated measurement, based on one of two industry standards that include a military standard and a commercial standard. Mil-Hdbk-217 is a military standard for the calculation of reliability of products. Bell core is a commercial standard that is often used in commercial and industrial equipments. In recent years, manufacturers have used a lot of methods for analyzing reliability prediction of products that includes a parts count analysis, a failure statistical analysis, and a failure simulation analysis.

Firstly, the parts count analysis is a first approximation of the calculated reliability of the products. This analysis needs a program to total and summarize the count results. Secondly, the failure simulation analysis looks at the failure of each component within a product to determine the effect on the performance of the product. This analysis is typically performed by using a specialized computer software to simulate a special operating environment and temperature. Thirdly, the failure statistical analysis assures that each component of products meets its performance specifications. This analysis needs a statistical theory for calculating the failures of simple or complex components.

What is needed, therefore, is a system and method for analyzing an MTBF of an electronic product, which can calculate the MTBF of the electronic product by means of a spreadsheet installed in a computer, so as to analyze the reliability of the electronic product.

SUMMARY OF THE INVENTION

A preferred embodiment of a system for analyzing a mean time between failures (MTBF) of an electronic product in accordance with a preferred embodiment includes: a database comprising a plurality of bill of material (BOM) tables that stores data on components of the electronic product; and a computer installed with a spreadsheet for analyzing the MTBF of the electronic product.

The computer includes: a data importing module for importing the data stored in the BOM tables to the spreadsheet; a reliability analyzing module for classifying the data in the spreadsheet, analyzing the reliability of the electronic product by calculating the MTBF of the electronic product in the spreadsheet, and for generating a reliability prediction report; a report outputting module for outputting the reliability prediction report; and an output device connected to the report outputting module for receiving the reliability prediction report.

Another preferred embodiment provides an electronic method for analyzing the MTBF of the electronic product, by utilizing the above system. The method includes the steps of: (a) importing data of the electronic product to a spreadsheet; (b) classifying the data in the spreadsheet according to component specifications and component types of the electronic product; (c) setting various calculating parameters and calculating formats for analyzing the classified data; (d) generating different equations according to the calculating parameters and the calculating formats; (e) calculating the failure rate of components and the failure rate of the electronic product according to the different equations; (f) calculating the MTBF of the electronic product according to failure rate of components and the failure rate of the electronic product; and (g) analyzing the reliability of the electronic product according to the MTBF of the electronic product.

Other advantages and novel features of the embodiments will be drawn from the following detailed description with reference to the attached drawings, in which:

DETAILED DESCRIPTION OF THE INVENTION

Figure 1:
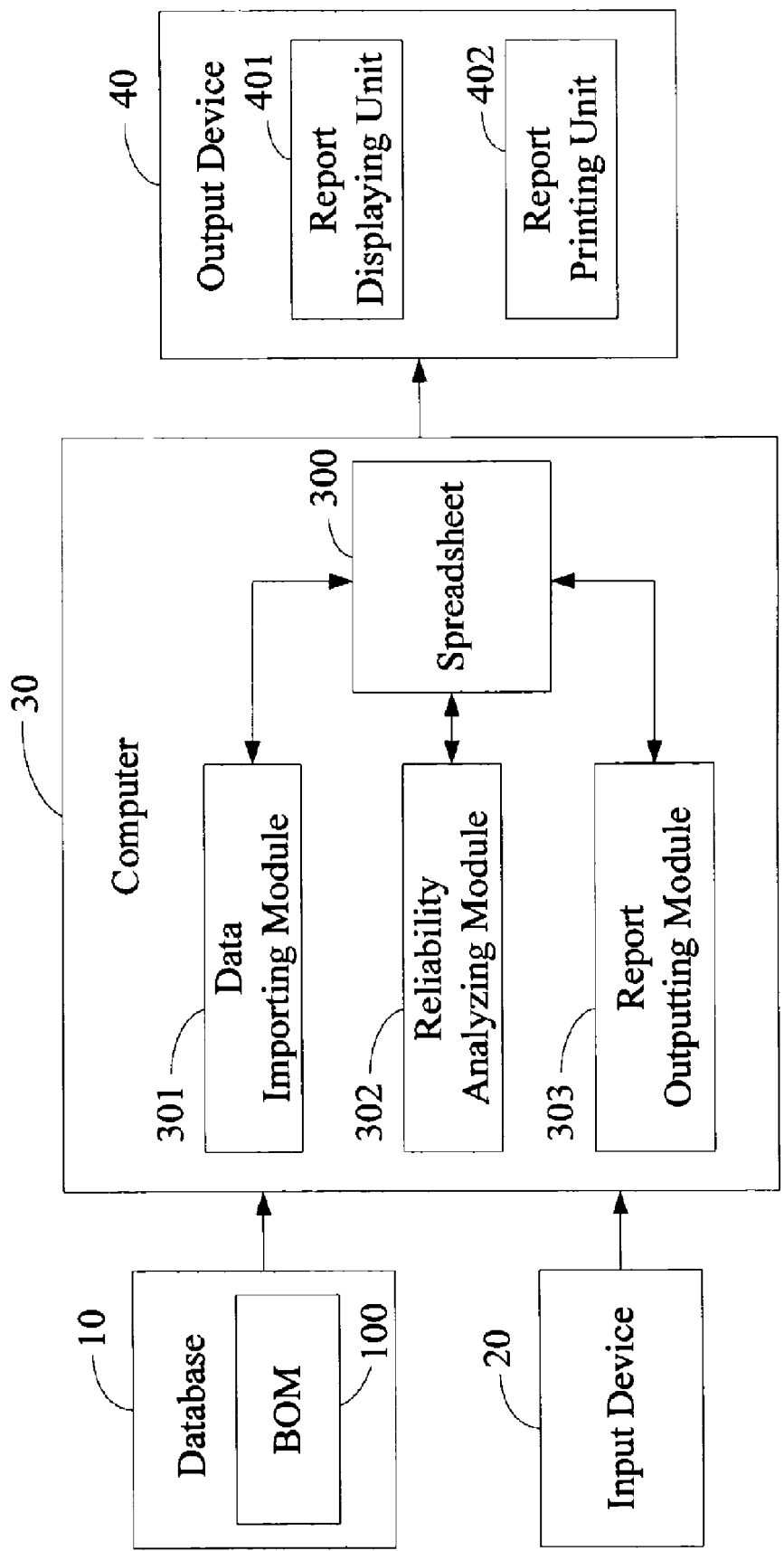
FIG. 1 is a schematic diagram of a system for analyzing a mean time between failures (MTBF) of an electronic product in accordance with a preferred embodiment.

FIG. 1 is a schematic diagram of a system for analyzing a mean time between failures (MTBF) of an electronic product (hereinafter "the system") in accordance with a preferred embodiment. The system may include a database 10, an input device 20, a computer 30, and output device 40. The database 10 may include a plurality of bill of material (BOM) tables 100 (only one is shown in FIG. 1). The BOM tables 100 are mainly used for storing data on components of an electronic product, such as component specifications and component types. The input device 20 is primarily configured for inputting various calculating formats and various calculating parameters when calculating MTBF of the electronic product. The calculating formats are desired formats for calculating the MTBF according to a user's requirements. The calculating parameters include quality parameters, stress parameters, power parameters, temperature parameters, and environment parameters. The input device 20 is typically selected from a keyboard, a mouse, or any other input tools. The computer 30 includes a spreadsheet 300, a data importing module 301, a reliability analyzing module 302, and a report generating module 303. The output device includes a report displaying unit 401 and a report printing unit 402.

The spreadsheet 300 may be an accounting or bookkeeping program installed in the computer 30, such as the Microsoft Excel, which is used for calculating the MTBF of the electronic product. The data importing module 301 is configured for importing the data stored in the BOM table 100 to the spreadsheet 300. The reliability analyzing module 302 is used for classifying the data on the spreadsheet 300, analyzing the reliability of the electronic product by calculating the MTBF of the electronic product on the spreadsheet 300, and for generating a reliability prediction report. The report outputting module 303 is used for outputting the reliability prediction report to the output device 40. The report displaying unit 401 is used for displaying the reliability prediction report. The report printing unit 402 is used for printing the reliability prediction repot.

Figure 2:
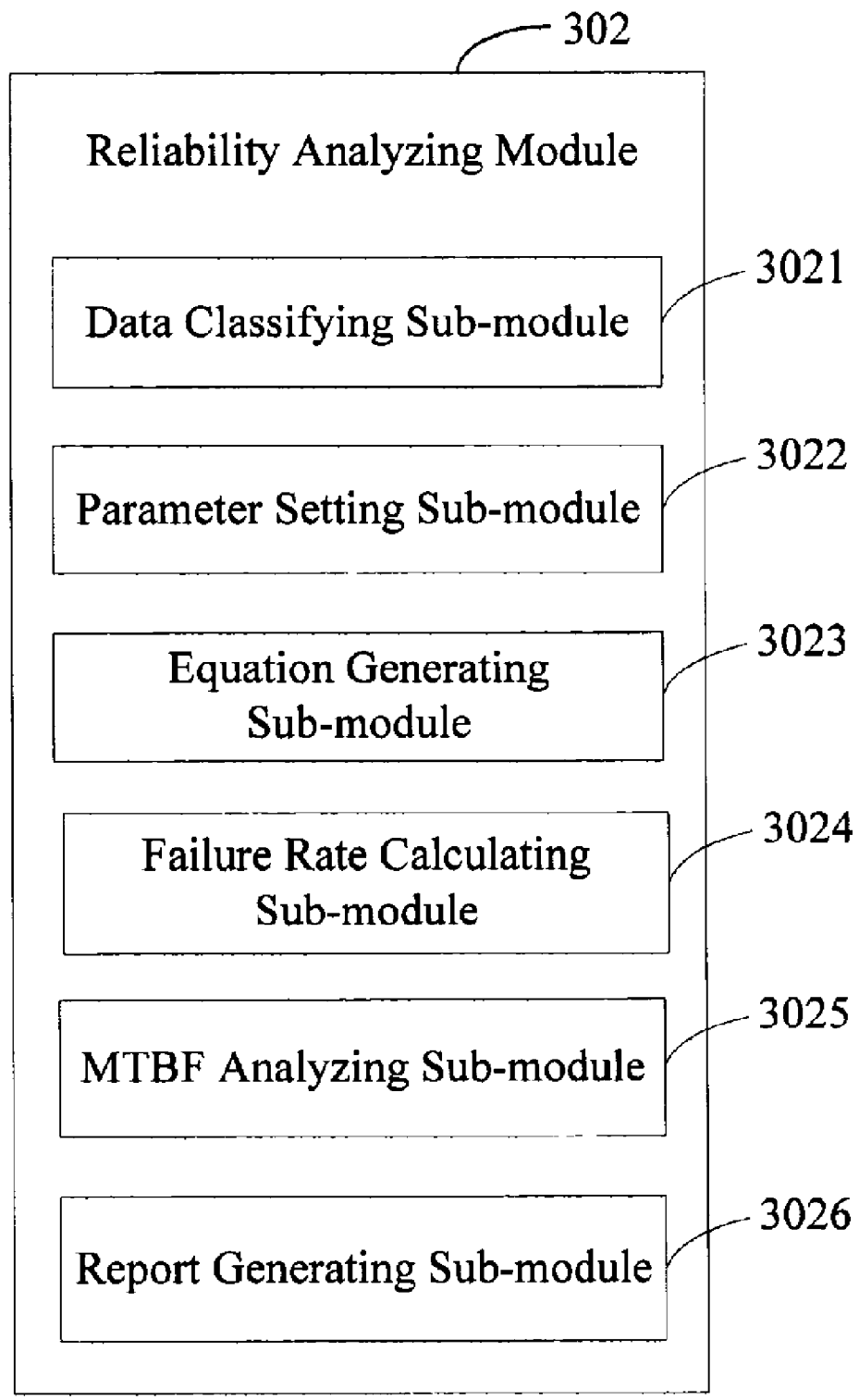
FIG. 2 is a schematic diagram of function modules of the reliability analyzing module of FIG. 1.

FIG. 2 is a schematic diagram of function modules of the reliability analyzing module 302. The reliability analyzing module 302 includes a data classifying sub-module 3021, a parameter setting sub-module 3022, an equation generating sub-module 3023, a failure rate calculating sub-module 3024, a MTBF analyzing sub-module 3025, and a report generating sub-module 3026.

The data classifying sub-module 3021 is used for classifying the data imported by the data importing module 301 in the spreadsheet 300 according to component specifications and component types of the electronic product. The parameter setting sub-module 3032 is used for setting various calculating parameters and calculating formats to analyze the classified data. The equation generating sub-module 3023 is used for generating different equations to calculate the MTBF of the electronic product according to calculating parameters and the calculating formats. The failure rate calculating sub-module 3024 is used for calculating the failure rate of components and the failure rate of the electronic product according to the different equations. The MTBF analyzing sub-module 3025 is used for calculating the MTBF of the electronic product according to the failure rate of the components and the failure rate of the electronic product, and analyzing the reliability of the electronic product according to the MTBF of the electronic product. The report generating sub-module 3026 is used for generating a reliability prediction report according to the MTBF and the reliability of the electronic product.

Figure 3:
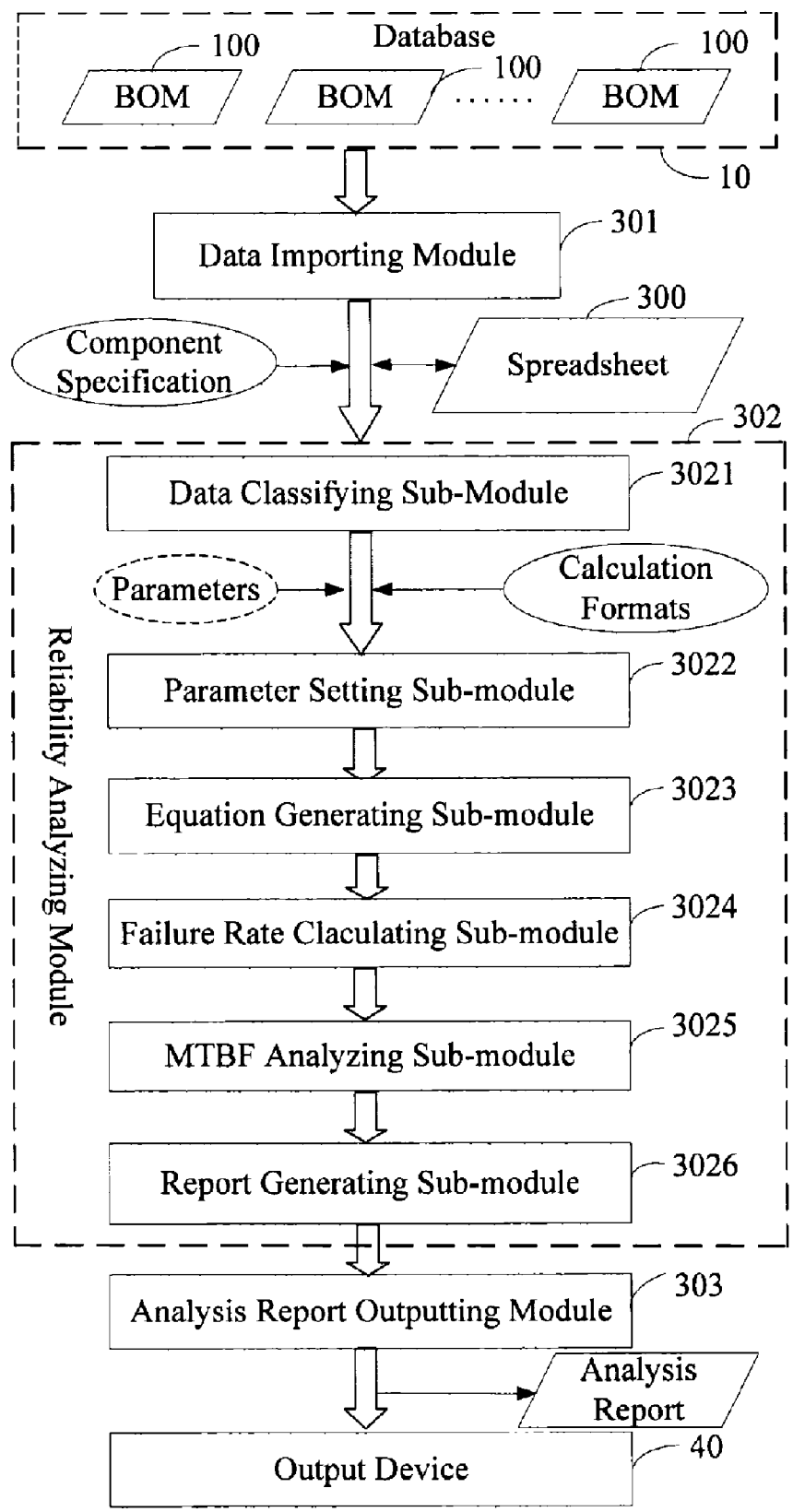
FIG. 3 illustrates main data interchanges between components of the system of FIG. 1.

FIG. 3 illustrates main data interchanges between components of the system of FIG. 1. data of the electronic product is stored in the BOM tables 100 of the database 10. The data importing module 301 imports the data form the BOM tables 100 to the spreadsheet 300 installed in the computer 30. The data classifying sub-module 3021 classifies the data on the spreadsheet 300 according to the component specifications and the component types of the electronic product. The parameter setting sub-module 3022 sets the calculating parameters and different calculating formats for analyzing the classified data according to the calculating parameters input by a user via the input device 2. The calculating parameters may include the basic parameters, the quality parameters, the stress parameters, the power parameters, the temperature parameters, and the environment parameters.

The equation generating sub-module 3023 generates different equations to calculate the MTBF of the electronic product according to the calculating formats. The failure rate calculating sub-module 3024 calculates the failure rate of each component and the failure rate of the electronic product according to the different equations.

The MTBF analyzing sub-module 3025 analyzes the MTBF of the electronic product according to the failure rate of the components and the failure rate of the electronic product, and analyzes the reliability of the electronic product according to the MTBF of the electronic product. The report generating sub-module 3026 generates a reliability prediction report according to the MTBF and the reliability of the electronic product.

The report outputting module 303 outputs the reliability prediction report to the output device 4. The user can display the reliability prediction report by utilizing the report displaying unit 401, or print the reliability prediction report by utilizing the report printing unit 402.

Figure 4:
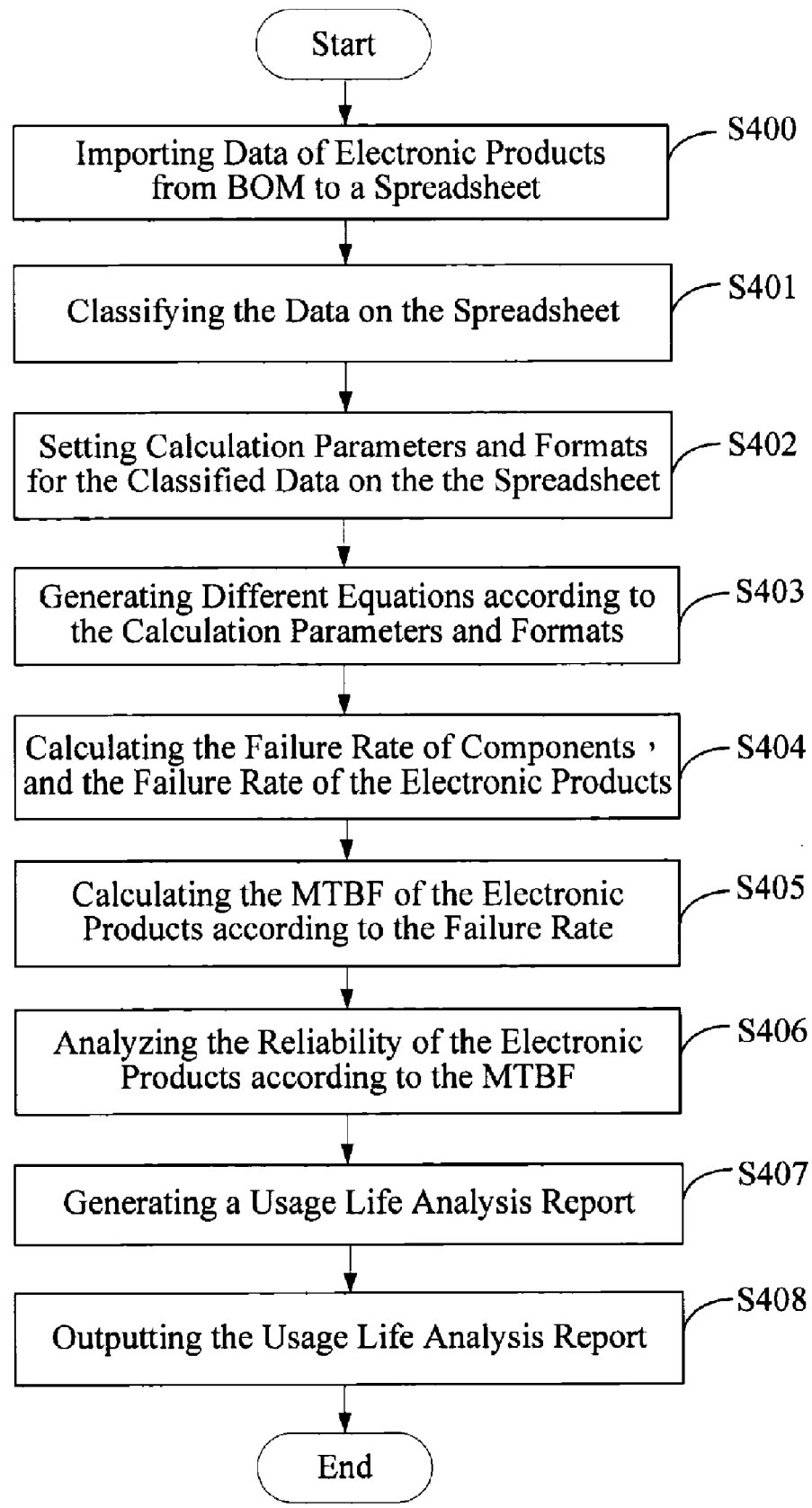
FIG. 4 is a flowchart of a preferred method for analyzing a mean time between failures (MTBF) of an electronic product by implementing the system of FIG. 1.

FIG. 4 is a flowchart of a preferred method for analyzing the MTBF of an electronic product by implementing the system as described above. In step S400, the data importing module 301 imports the data from one of the BOM tables 100 to the spreadsheet 300 installed in the computer 30. In step S401, the data classifying sub-module 3021 classifies the data imported by the data importing module 301 on the spreadsheet 300 according to the component specifications and the component types of the electronic product, in order to improve the analysis speed.

In step S402, the parameter setting sub-module 3022 sets various calculating parameters and calculating formats to analyze the classified data. In step S403, the equation generating sub-module 3023 generates different equations to calculate the MTBF of the electronic product according to the calculating formats and the calculating parameters. In step S404, the failure rate calculating sub-module 3024 calculates the failure rate of the components and the failure rate of the electronic product according to the different equations.

In step S405, the MTBF analyzing sub-module 3025 calculates the MTBF of the electronic product according to the failure rate of each component and the failure rate of the electronic product. In step S406, the MTBF analyzing sub-module 3025 analyzes the reliability of the electronic product according to the MTBF of the electronic product.

In step S407, the report generating sub-module 3026 generates a reliability prediction report for the electronic product according to the MTBF and the reliability of the electronic product. In step S408, the report outputting module 303 outputs the reliability prediction report to the report displaying unit 401 for displaying the reliability prediction report, or to the report printing unit 402 for printing the reliability prediction report.

The following describes an example of implementing the system and method as described above. It is assumed that an electronic product includes a plurality of resistances. The parameters for analyzing the MTBF of the electronic product is as follows: the basic parameter depicted as $\lambda_b$, the temperature parameter depicted as $\pi_T$, the stress parameter depicted as $\pi_S$, the quality parameter depicted as $\pi_Q$, the environment parameter depicted as $\pi_E$, and the power parameter depicted as $\pi_P$. The coordinate value of $\lambda_b$, $\pi_T$, $\pi_S$, $\pi_Q$, $\pi_E$, and $\pi_P$ respectively corresponds to $I_{10}$, $J_{10}$, $M_{10}$, $N_{10}$, $O_{10}$, and $Q_{10}$ on the spreadsheet 300.

The parameter setting sub-module 3023 sets a calculating format, symbolically depicted as $\lambda=\lambda_b*\pi_T*\pi_S*\pi_Q*\pi_E*\pi_P$, for calculating the failure rate of resistances, wherein A represents the failure rate of the resistances, and the coordinate value of $\lambda$ is $G_{10}$ on the spreadsheet 300. The MTBF calculating sub-module 3024 calculates the failure rate of the resistance according to a first equation: $G_{10}=I_{10}*J_{10}*M_{10}*N_{10}*O_{10}*Q_{10}$. It is assumed that the number of resistances N whose coordinate value is $F_{10}$ on the spreadsheet 300. The MTBF calculating sub-module 3024 calculates the failure rate of all resistances (symbolically depicted as $\lambda_{Parts}$) according to a second equation: $E_{10}=F_{10}*G_{10}$, wherein $E_{10}$ represents the coordinate value of $\lambda_{Parts}$ on the spreadsheet 300. The MTBF calculating sub-module 3024 calculates the MTBF of the electronic product according to the third equation: $J_3=SUM(E_{10}:E_{10})$, wherein $J_3$ represents the coordinate value of the MTBF of electronic product on the spreadsheet 300. The MTBF calculating sub-module 3024 calculates the reliability of the electronic product according to the forth equation: $J_4=(1/J_3)*1000000$, wherein $J_4$ represents the coordinate value of the reliability of electronic product on the spreadsheet 300. The report generating sub-module 3025 generates the reliability prediction report according to the MTBF and the reliability of electronic product.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for analyzing a mean time between failures (MTBF) of an electronic product, the system comprising:
   a database comprising a plurality of bill of material (BOM) tables for storing data on components of the electronic product; and
   a computer being installed with a spreadsheet for analyzing the MTBF of the electronic product, the computer comprising:
   a data importing module configured for importing the data in the BOM tables to the spreadsheet;
   a reliability analyzing module configured for analyzing a reliability of the electronic product by using the spreadsheet, and generating a reliability prediction report, wherein the reliability analyzing module comprises:
   a data classifying sub-module configured for classifying the data on the spreadsheet according to component specifications and component types of the electronic product;
   a parameter setting sub-module configured for setting various calculating parameters and calculating formats to analyze the classified data;
   an equation generating sub-module configured for generating different equations according to the calculating parameters and the calculating formats;
   a failure rate calculating sub-module configured for calculating a failure rate of the components and a failure rate of the electronic product according to the equations;
   a MTBF analyzing sub-module configured for calculating the MTBF of the electronic product according to the failure rate of the components and the failure rate of the electronic product, and analyzing the reliability of the electronic product according to the MTBF of the electronic product; and
   a report outputting module for outputting the reliability prediction report; and
   an output device connected to the report outputting module for receiving the reliability prediction report.

2. The system according to claim 1, further comprising an input device configured for receiving the calculating formats and calculating parameters when calculating the MTBF of the electronic product.

3. The system according to claim 1, wherein the spreadsheet is an accounting or bookkeeping program.

4. The system according to claim 1, wherein the reliability analyzing module further comprises a report generating sub-module for generating the reliability prediction report according to the MTBF and the reliability of the electronic product.

5. The system according to claim 1, wherein the output device is a report displaying unit for displaying the reliability prediction report.

6. The system according to claim 1, wherein the output device is a report printing unit for printing the reliability prediction report.

7. A computer-enabled method for analyzing a mean time between failures (MTBF) of an electronic product, the method comprising the steps of:
   importing data of the electronic product from a database to a spreadsheet installed in a computer;
   classifying the data on the spreadsheet according to component specifications and component types of the electronic product;
   setting various calculating parameters and calculating formats for analyzing the classified data via an input device;
   generating different equations according to the calculating parameters and the calculating formats;
   calculating a failure rate of components and a failure rate of the electronic product according to the different equations;
   calculating the MTBF of the electronic product according to the failure rate of components and the failure rate of the electronic product;
   analyzing a reliability of the electronic product according to the MTBF of the electronic product;
   generating a reliability prediction report of the electronic product according to the MTBF and the reliability of the electronic product; and
   outputting the reliability prediction report to an output device, and displaying the reliability prediction report on a report display unit of the output device.

8. The method according to claim 7, wherein the database comprises a plurality of bill of material (BOM) tables for storing the data of the electronic product that comprise the component specifications and the component types of the electronic product.

9. The method according to claim 7, further comprising the step of printing the reliability prediction report by a report printing unit of the output device.

* * * * *

UNITED STATES PATENT AND TRADEMARK OFFICE
CERTIFICATE OF CORRECTION

PATENT NO.        : 7,596,727 B2
APPLICATION NO. : 11/309564
DATED             : September 29, 2009
INVENTOR(S)       : Szu-Wei Kuo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Twenty-eighth Day of September, 2010

David J. Kappos
*Director of the United States Patent and Trademark Office*